(12) United States Patent
He et al.

(10) Patent No.: US 9,079,309 B2
(45) Date of Patent: Jul. 14, 2015

(54) TERMINAL POSITIONING METHOD AND SYSTEM, AND MOBILE TERMINAL

(71) Applicant: Lenovo (Beijing) Co., Ltd., Beijing (CN)

(72) Inventors: Zhiqiang He, Beijing (CN); Nanjun Li, Beijing (CN)

(73) Assignee: Lenovo (Beijing) Co., Ltd., Beijing (CN)

( * ) Notice: Subject to any disclaimer, the term of this patent is extended or adjusted under 35 U.S.C. 154(b) by 95 days.

(21) Appl. No.: 13/920,340

(22) Filed: Jun. 18, 2013

(65) Prior Publication Data

US 2014/0005832 A1 Jan. 2, 2014

(30) Foreign Application Priority Data

Jun. 29, 2012 (CN) .......................... 2012 1 0226516

(51) Int. Cl.
*H04W 24/00* (2009.01)
*B25J 9/16* (2006.01)
(52) U.S. Cl.
CPC ..................................... *B25J 9/1697* (2013.01)
(58) Field of Classification Search
CPC .......................... G06Q 30/0267; H04L 12/2825

USPC ........................... 700/259; 455/456.1–456.3, 455/414.1–414.3, 436–441, 404.2; 342/357.2, 357.21, 357.25

See application file for complete search history.

(56) References Cited

U.S. PATENT DOCUMENTS

| 2007/0226349 A1* | 9/2007 | Nakaguma .................... 709/227 |
| 2008/0077324 A1* | 3/2008 | Hatano et al. ................. 701/212 |
| 2014/0274136 A1* | 9/2014 | Edge et al. ................. 455/456.2 |

* cited by examiner

*Primary Examiner* — Dalena Tran
(74) *Attorney, Agent, or Firm* — Harness, Dickey & Pierce, P.L.C.

(57) ABSTRACT

A terminal positioning method is applicable in a positioning system having at least an image acquisition apparatus, and the method includes: judging whether a positioning request message sent from a terminal is received; acquiring a current position feature of the terminal when the positioning request message sent from the terminal is received; calculating current position data of the terminal according to the position feature; generating position information according to the position data; and sending the position information to the terminal. In this way, the terminal itself does not need to calculate the current position, thus reducing computational burden on the terminal, which facilitates achieving of fast navigation of the terminal.

10 Claims, 5 Drawing Sheets

TERMINAL POSITIONING METHOD AND SYSTEM, AND MOBILE TERMINAL

CROSS REFERENCE TO RELATED APPLICATION

This application claims the benefit of priority to Chinese Patent Application No. 201210226516.9, entitled "Terminal positioning method and system, and mobile terminal", filed on Jun. 29, 2012 with State Intellectual Property Office of PRC, which is incorporated herein by reference in its entirety.

FIELD OF THE INVENTION

The invention relates to the field of automatic control, and in particular to a terminal positioning method and system, and a mobile terminal.

BACKGROUND OF THE INVENTION

At present, large calculation amount is still a bottleneck restricting the development of the robot real-time positioning technology. In the existing robot real-time positioning method, usually, the robot pre-stores the environment map, acquires external environmental parameters, and calculates its current position in the map based on the acquired parameters; or the robot constructs the environment map based on the acquired parameters and then calculates its current location in the map, so as to positioning the robot itself. Typically, the amount of calculation is large, which places high requirements on the hardware and software of the robot. In addition, a large amount of calculation is disadvantageous to the fast navigation for the robot.

SUMMARY OF THE INVENTION

In view of this, the invention provides a robot positioning method and system, and a mobile terminal, in order to solve the problem in the existing robot positioning method that the robot bears an excessive calculation burden.

In order to achieve the above object, the embodiments of the invention provide the following technical solutions.

A terminal positioning method applicable in a positioning system having at least an image acquisition apparatus, the terminal positioning method including:

judging whether a positioning request message sent from a terminal is received;

acquiring a current position feature of the terminal when the positioning request message sent from the terminal is received;

calculating current position data of the terminal according to the position feature; generating position information according to the position data; and sending the position information to the terminal.

Preferably, the acquiring a current position feature of the terminal includes:

acquiring a current image of the terminal.

Preferably, the calculating current position data of the terminal according to the position feature includes:

calculating a spatial distance between the terminal and the image acquisition apparatus according to the image of the terminal; and determining the current position data of the terminal according to the spatial distance.

Preferably, the position information includes:

a map of the current environment and position coordinates of the terminal in the map of the current environment; or position coordinates of the terminal in a map of the current environment.

Preferably, the generating position information according to the position data includes:

converting the position data into position coordinates in the map of the current environment.

Preferably, in the case where the number of terminals is greater than one, the method further includes, before the acquiring a current position feature of the terminal, determining, according to the positioning request message, the terminal which requests positioning.

A terminal positioning method applicable in a mobile terminal or an electronic device, including:

sending a positioning request message;

receiving position information, wherein the position information is generated in a way that when a server receives the positioning request message sent from the terminal, the server acquires a current position feature of the terminal, calculates current position data of the terminal according to the position feature, and generates the position information according to the position data.

A terminal positioning system, including:

a judgment unit, adapted to judge whether a positioning request message sent from a terminal is received;

a feature acquisition unit, adapted to acquire a current position feature of the terminal when the positioning request message sent from the terminal is received;

a calculation unit, adapted to calculate current position data of the terminal according to the position feature;

a position information generation unit, adapted to generate position information according to the position data; and a sending unit, adapted to send the position information to the terminal.

Preferably, the judgment unit includes:

a wireless access point, adapted to receive a positioning request message sent from the terminal; and a judgment sub-unit, adapted to judge whether the wireless access point receives a positioning request message sent from the terminal.

Preferably, the feature acquisition unit includes:

an image acquisition apparatus, adapted to acquire an image of the terminal.

Preferably, the calculation unit includes:

a spatial distance calculation unit, adapted to calculate a spatial distance between the terminal and the image acquisition apparatus according to the image of the terminal; and a position data determination unit, adapted to determine current position data of the terminal according to the spatial distance.

Preferably, the terminal positioning system further includes:

a terminal recognition unit, adapted to determine, according to the positioning request message, the terminal which requests positioning, in a case where the number of terminals is greater than one.

A mobile terminal, including:

a sending unit, adapted to send a positioning request message; and;

a receiving unit, adapted to receive position information, wherein the position information is generated in the following way: when a server receives the positioning request message sent from the terminal, the server acquires a current position feature of the terminal, calculates current position data of the terminal according to the position feature, and generates the position information according to the position data.

In the terminal positioning method and system and the mobile terminal provided by the embodiments of the invention, by means of the information interaction between the terminal and the positioning system, the positioning system acquires a current position feature of the terminal, calculates current position data of the terminal according to the acquired position feature, determines position information according to the position data, and sends the position information to the terminal, and in this way, the terminal itself does not need to calculate its current position, thus reducing computational burden on the terminal, which facilitates fast navigation of the terminal.

BRIEF DESCRIPTION OF THE DRAWINGS

Technical solutions of the embodiments of the present applicant and/or the prior art will be illustrated more clearly with the following brief description of the drawings. Apparently, the drawings referred to in the following description are merely some embodiments of the invention. Those skilled in the art may obtain other drawings from these drawings without any creative efforts.

DETAILED DESCRIPTION OF THE INVENTION

The invention discloses a terminal positioning method and system and a mobile terminal. In an embodiment of the present invention, the terminal sends a positioning request message; once receiving the positioning request message, the positioning system acquires a current position feature of the terminal, calculates current position data of the terminal from the position feature, generates position information according to the position data, and sends the position information to the terminal; the terminal receives the position information. In this way, the terminal obtains the current position of itself according to the calculation result from the positioning system, and therefore the burden of positioning exerted on the terminal is alleviated and the fast positioning is implemented.

The technical solutions in the embodiments of the invention will be described clearly and completely hereinafter in conjunction with the drawings. Apparently, the embodiments described are only some embodiments of the invention, rather than all embodiments. Any other embodiments that can be obtained by those skilled in the art without any creative efforts fall into the scope of protection of the invention.

Figure 1:
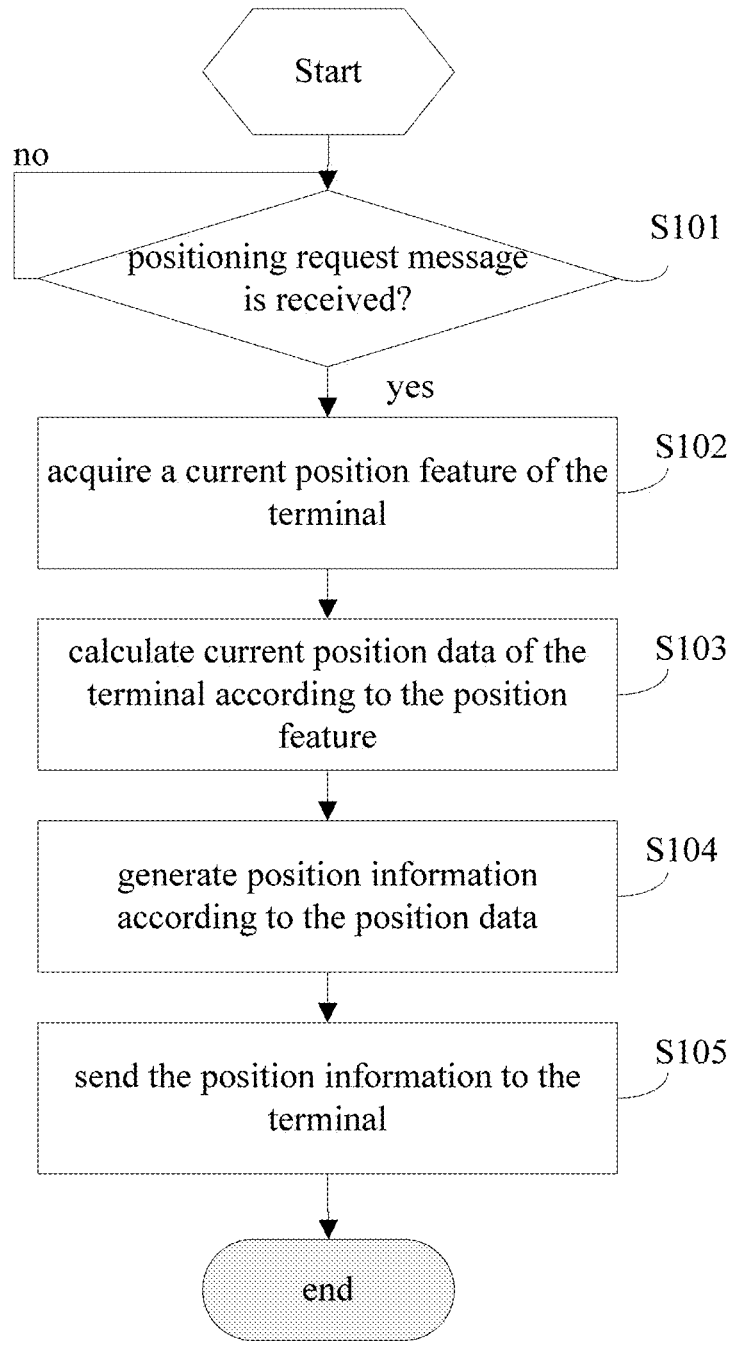
FIG. 1 is a flow chart of a terminal positioning method according to an embodiment of the invention.

As shown in FIG. 1, according to an embodiment of the invention, a terminal positioning method, applicable in a positioning system at least including an image acquisition apparatus, includes the following steps.

Step S101: judging whether a positioning request message sent from a terminal is received.

The positioning system can stay in a state of waiting to receive a message, and can keep in the state of receiving until a positioning request message is received.

Step S102: acquiring a current position feature of the terminal when the positioning request message sent from the terminal is received.

The position feature of the terminal refers to a feature representing the current state of the terminal. In the embodiment, the current position feature of the terminal is preferably a required image of the terminal at the current position.

Step S103: calculating current position data of the terminal according to the position feature.

Data for the physical spatial position of the terminal can be calculated according to the acquired position feature.

Step S104: generating position information according to the position data.

The position data can be encapsulated into position information in accordance with known communication protocols, or the position data can be encapsulated into position information after a preset convention performed on the position data.

Step S105: sending the position information to the terminal.

In the terminal positioning method according to the embodiment, the acquisition of the spatial feature of the terminal, the calculation of the position data and the generation of the position information are performed by the terminal positioning system, thus the terminal itself does not need to perform the positioning process, thereby reducing the computational burden on the terminal, which facilitates quick positioning and navigation of the terminal.

Figure 2:
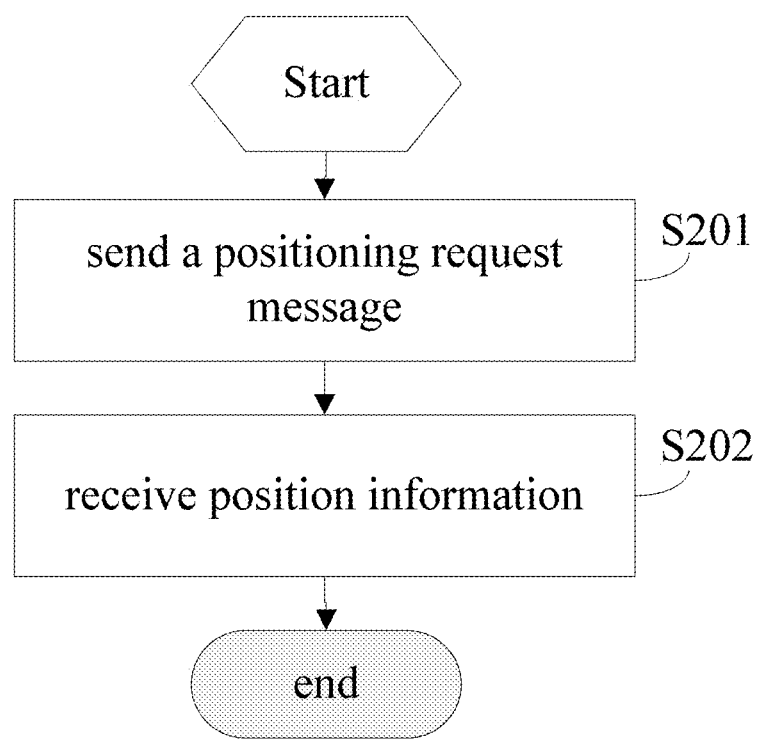
FIG. 2 is a flow chart of a terminal positioning method according to another embodiment of the invention.

The embodiments of the invention further disclose a terminal positioning method applicable in a mobile terminal or an electronic device, in which the terminal positioning method is used in conjunction with the positioning system described in the above embodiment. As shown in FIG. 2, the terminal positioning method includes the following steps.

Step S201: sending a positioning request message.

It should be noted that, in the embodiment, the terminal can send the positioning request message in a way of a radio broadcast message. When the terminal is not in the coverage area of the positioning system, the positioning request message can not be received by the positioning system, and when the terminal is in the coverage area of the positioning system, the broadcast message can be received by the positioning system.

Step S202: receiving position information.

The position information is generated in the following way: when the positioning system receives the positioning request message sent from the terminal, the positioning system acquires a current position feature of the terminal, calculates current position data of the terminal according to the position feature, and generates the position information according to the position data.

In the terminal positioning method according to the embodiment, the terminal simply sends the positioning request message and receives the positioning information, i.e., the terminal does not need to perform calculation in the positioning process, thereby reducing the data processing burden on the terminal.

Figure 3:
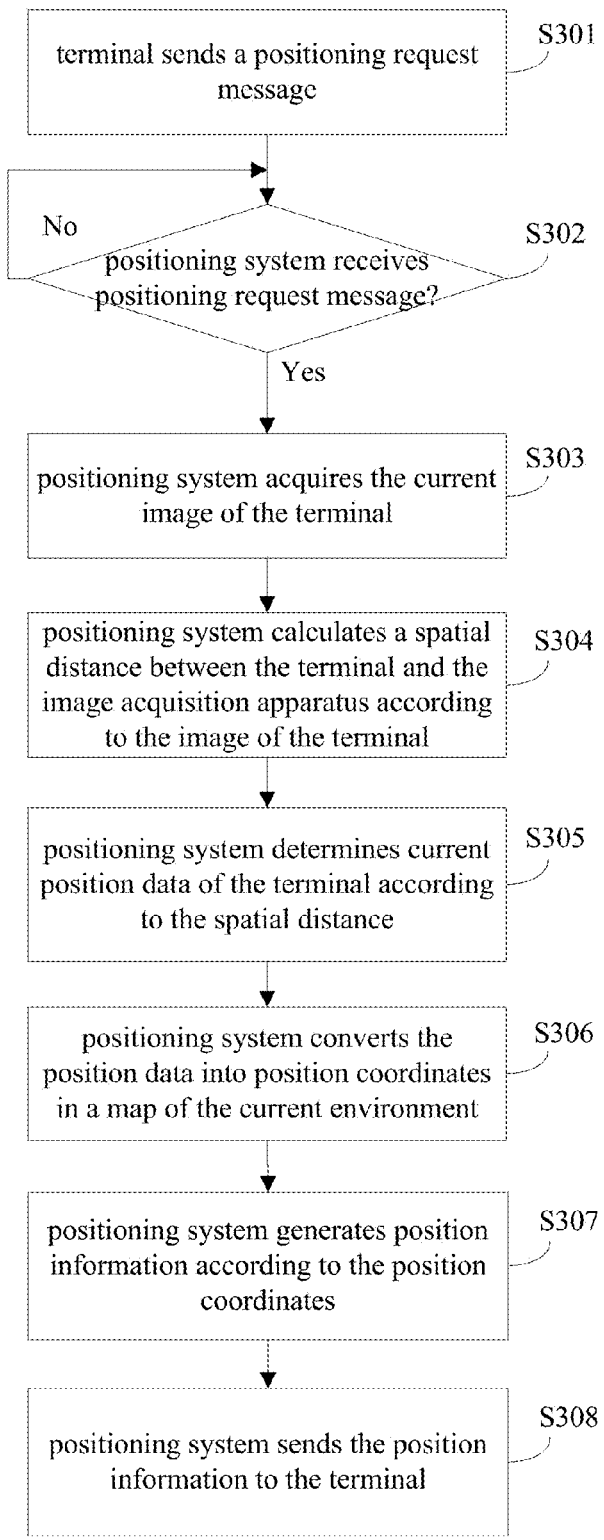
FIG. 3 is a flow chart of a terminal positioning method according to yet another embodiment of the invention.

In the following, the terminal positioning method according to the invention will be described in detail. As shown in FIG. 3, a terminal positioning method according to an embodiment of the invention includes the following steps.

Step S301: sending, by a terminal, a positioning request message.

The terminal can send the positioning request message in a way of a radio broadcast message.

Step S302: judging, by the positioning system, whether the positioning request message sent from the terminal is received.

The positioning system can stay in a state of waiting to receive a message. Once the terminal enters into the coverage area of the positioning system, the positioning system can receive the broadcast signal transmitted from the terminal.

Step S303: acquiring, by the positioning system, a current image of the terminal when receiving the positioning request message sent from the terminal.

Step S304: calculating, by the positioning system, a spatial distance between the terminal and an image acquisition apparatus according to the image of the terminal.

Step S305: determining, by the positioning system, current position data of the terminal according to the spatial distance.

Step S306: converting, by the positioning system, the position data into position coordinates in a map of the current environment.

Step S307: generating, by the positioning system, position information according to the position coordinates.

The position information may include the map of the current environment and position coordinates of the terminal in the map of the current environment; alternatively, the position information may include position coordinates of the terminal in the map of the current environment.

In other words, the map of the current environment may be sent to the terminal by the positioning system, or may be pre-stored in the terminal. In the case where the map of the current environment is stored in the terminal, the terminal only needs to receive the position coordinates of the terminal in the map of the current environment. The navigation of the terminal can be implemented according to the map of the current environment and the position coordinates of the terminal in the map of the current environment.

Step S308: sending, by the positioning system, the position information to the terminal.

Further, the number of terminals that request the position system for positioning may be greater than one. When the number of terminals which request positioning is greater than one, before the step S303 of acquiring the current image of the terminal by the positioning system, the method further includes:

determining, according to the positioning request message, the terminal which requests the positioning.

In this way, correct correspondence between positioning request messages and terminals that request positioning is established, so that the positioning information can be sent to the corresponding terminals correctly.

In the terminal positioning method according to the embodiment, by interactions between the terminal and the positioning system, the current position information of the terminal is calculated by the positioning system and is sent to the terminal, which facilitates the positioning of the terminal; since the calculation of the position data is carried out in the positioning system, the computational burden on the terminal is alleviated and the fast positioning and navigation of the terminal is facilitated.

Figure 4:
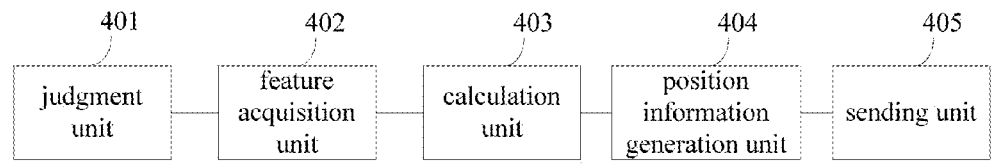
FIG. 4 is a structural diagram of a terminal positioning system according to an embodiment of the invention.

Corresponding to the method embodiments described above, an embodiment of the invention discloses a terminal positioning system. As shown in FIG. 4, the terminal positioning system includes a judgment unit 401, a feature acquisition unit 402, a calculation unit 403, a position information generation unit 404 and a sending unit 405.

The judgment unit 401 is adapted to judge whether a positioning request message sent from a terminal is received.

In practical applications, the judgment unit may include a wireless access point and a judgment sub-unit. The wireless access point is adapted to receive the positioning request message sent from the terminal, and the judgment sub-unit is adapted to judge whether the wireless access point receives the positioning request message sent from the terminal.

The feature acquisition unit 402 is adapted to acquire a current position feature of the terminal when the positioning request message sent from the terminal is received;

In the embodiment, the feature acquisition unit preferably includes an image acquisition apparatus adapted to acquire an image of the terminal. Specifically, the image acquisition apparatus includes a camera and an image acquisition card. It should be noted that the position of the camera is fixed, so that the distance between the terminal and the camera can be calculated subsequently according to the acquired image.

The calculation unit 403 is adapted to calculate current position data of the terminal according to the position feature.

Further, the calculation unit may includes:

a spatial distance calculation unit, adapted to calculate a spatial distance between the terminal and the image acquisition apparatus according to the image of the terminal; and a position data determination unit, adapted to determine the current position data of the terminal according to the spatial distance.

The position information generating unit 404 is adapted to generate position information according to the position data.

The sending unit 405 is adapted to send the position information to the terminal.

Figure 5:
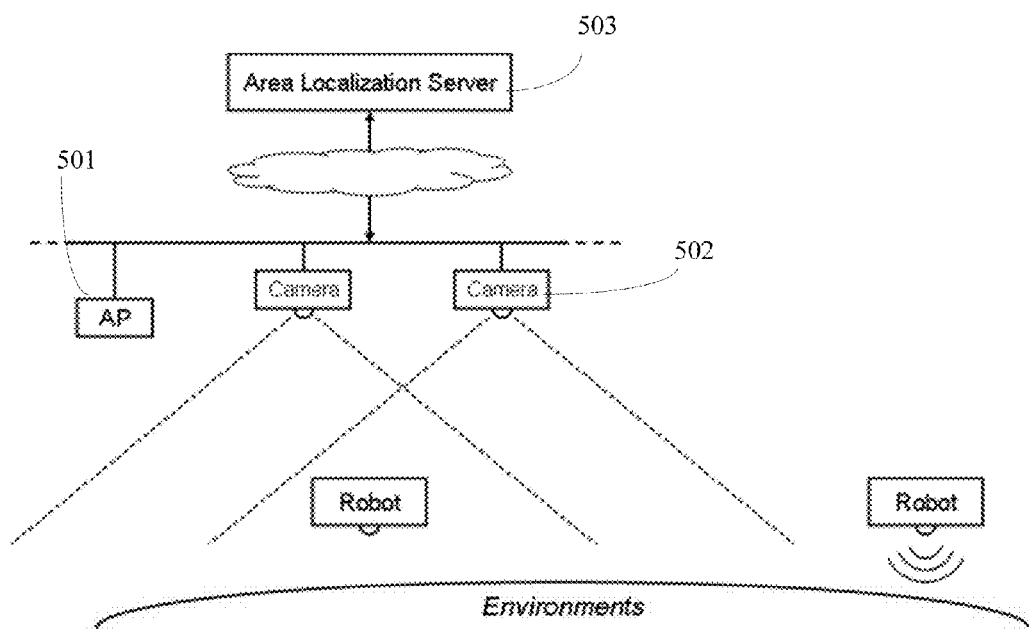
FIG. 5 is a structural diagram of a terminal positioning system according to another embodiment of the invention.

In actual applications, as shown in FIG. 5, the positioning system according to the embodiment may include:

a wireless access point 501, adapted to receive a positioning request message sent from the terminal;

an image acquisition apparatus 502, adapted to acquire the current image of the terminal; and a server 503, adapted to: judge whether the positioning request message sent from the terminal is received; control the image acquisition apparatus to acquire a current position feature of the terminal when receiving the positioning request message sent from the terminal; calculate current position data of the terminal according to the position feature; generate position information according to the position data, and send the position information to the terminal.

Further, the positioning system includes:

a terminal recognition unit, adapted to determine, according to the positioning request message, the terminal which requests positioning, in the case where the number of terminals is greater than one.

In the terminal positioning system according to the embodiment, the acquisition of the spatial feature of the terminal, the calculation of the position data and the generation of the position information are performed by the terminal positioning system, thus the terminal itself does not need to perform the positioning, thereby reducing the computational burden on the terminal, which facilitates the fast positioning and navigation of the terminal.

Figure 6:
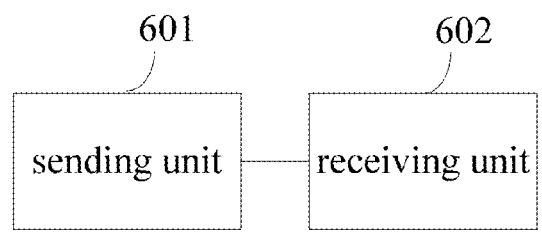
FIG. 6 is a structural diagram of a mobile terminal according to an embodiment of the invention.

The embodiments of the invention further disclose a mobile terminal. As shown in FIG. 6, the mobile terminal includes:

a sending unit 601, adapted to send a positioning request message; and a receiving unit 602, adapted to receive position information, wherein the position information is generated in the following way: when the positioning system receives the positioning request message sent from the terminal, the positioning system acquires a current position feature of the terminal, calculates current position data of the terminal according to the position feature, and generates the position information according to the position data.

The mobile terminal according to the embodiment may be a mobile robot. By cooperation with the positioning system described in the above embodiment, the terminal simply sends the positioning request message and receive the positioning information, i.e., the terminal does not need to perform calculation in the positioning process, thereby reducing the data processing burden on the terminal.

In the following, the principle of the mobile terminal and the terminal positioning system according to above embodiments is illustrated in detail.

Figure 7:
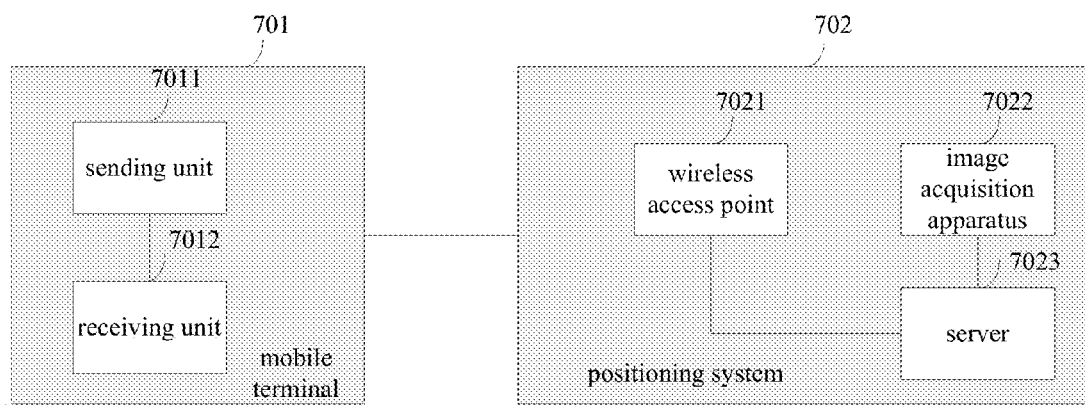
FIG. 7 is a structural diagram of a terminal positioning system according to another embodiment of the invention.

An embodiment of the invention discloses a terminal positioning system. As shown in FIG. 7, the terminal positioning system includes:

a mobile terminal 701 including a sending unit 7011 and a receiving unit 7012; and a positioning system 702 including a wireless access point 7021, an image acquisition apparatus 7022 and a server 7023. The he wireless access point and the image acquisition apparatus of the positioning system are both connected with the server and are controlled by the server. The positioning system can achieve a certain range of coverage by the wireless access point.

The positioning of the mobile terminal by the terminal positioning system is as follows: when the sending unit 7011 of the mobile terminal 701 sends a positioning request message, the wireless access point 7021 of the positioning system receives the positioning request message sent from the terminal; the server 7023 controls the image acquisition apparatus 7022 to acquire the current image of the terminal and acquire a current position feature of the terminal, calculates current position data of the terminal according to the position feature, generates position information according to the position data, and sends the position information to the mobile terminal 701; and the mobile terminal 701 receives the positioning information, thus completing the positioning of the terminal.

It should be noted that, the terminal can start the autonomous positioning when entering the coverage area of the positioning system.

When the function of the method according to the embodiments is implemented in a form of software function unit and is sold or used as a separate product, it can be stored in a computing device readable storage medium. Based on this understanding, parts of the embodiments of the invention which contribute to the prior art or part of the technical solution can be embodied as a software product stored in a storage medium which includes a number of instructions causing a computing device (which may be a personal computer, a server, a mobile computing device, a network device, etc.) to perform all or some of the steps in the methods according to various embodiments of the invention. The storage medium includes various media capable of storing program codes, such as U disk, mobile hard disk, ROM (Read-Only Memory), RAM (Random Access Memory), magnetic disk, or optical disk.

The embodiments of the invention are described herein in a progressive manner, each of which emphasizes the differences from others; hence, for the same or similar parts between the embodiments, one can refer to the other embodiments.

The description of the embodiments herein enables those skilled in the art to implement or use the invention. Numerous modifications to the embodiments will be apparent to those skilled in the art, and the general principle herein can be implemented in other embodiments without deviation from the spirit or scope of the invention. Therefore, the invention will not be limited to the embodiments described herein, but covers the widest scope consistent with the principle and novel features disclosed herein.

The invention claimed is:

1. A terminal positioning method applicable in a positioning system, the positioning system including an image acquisition apparatus, the terminal positioning method comprising:
    receiving, at the positioning system, a positioning request message sent from a terminal;
    acquiring, by the image acquisition apparatus of the positioning system, a current image of the terminal in response to the positioning request message being received;
    calculating, by the positioning system, current position data of the terminal according to the current image of the terminal acquired by the image acquisition apparatus;
    generating, by the positioning system, position information according to the position data; and
    sending, by the positioning system, the position information to the terminal.

2. The method according to claim 1, wherein the calculating current position data of the terminal according to the current image comprises:
    calculating, by the positioning system, a spatial distance between the terminal and the image acquisition apparatus according to the current image of the terminal; and
    determining, by the positioning system, the current position data of the terminal according to the spatial distance.

3. The method according to claim 1, wherein the position information comprises:
    position coordinates of the terminal in a map of a current environment; or
    the position coordinates of the terminal in the map of the current environment and the map of the current environment.

4. The method according to claim 3, wherein the generating position information according to the position data comprises:
    converting, by the positioning system, the position data into the position coordinates in the map of the current environment; and
    generating, by the positioning system, the position information according to the position coordinates.

5. The method according to claim 1, wherein in a case where the number of terminals is greater than one, the method further comprises, before the acquiring the current image of the terminal,
    determining, by the positioning system, the terminal that transmitted the positioning request message based on the positioning request message.

6. A terminal positioning method comprising:
    sending, by a terminal, a positioning request message to a positioning system; and
    receiving, at the terminal, position information of the terminal from the positioning system, wherein the position information is generated in a way that the positioning system acquires a current image of the terminal via an image acquisition apparatus of the positioning system, calculates current position data of the terminal according to the current image acquired by the image acquisition apparatus, and generates the position information according to the position data.

7. A terminal positioning system, comprising:
    a judgment unit adapted to judge whether a positioning request message sent from a terminal is received;

a feature acquisition unit includes an image acquisition apparatus, the feature acquisition unit adapted to acquire an image of the terminal via the image acquisition apparatus when the positioning request message sent is received from the terminal;

a calculation unit adapted to calculate current position data of the terminal according to the image acquired by the image acquisition apparatus of the feature acquisition unit;

a position information generation unit adapted to generate position information according to the position data; and a sending unit adapted to send the position information to the terminal.

8. The system according to claim 7, wherein the judgment unit comprises:

a wireless access point adapted to receive the positioning request message sent from the terminal; and a judgment sub-unit adapted to judge whether the wireless access point receives the positioning request message from the terminal.

9. The system according to claim 7, wherein the calculation unit comprises:

a spatial distance calculation sub-unit adapted to calculate a spatial distance between the terminal and the image acquisition apparatus according to the image of the terminal; and a position data determination unit adapted to determine the current position data of the terminal according to the spatial distance.

10. The system according to claim 7, further comprising:

a terminal recognition unit adapted to determine the terminal that sent the positioning request message based on the positioning request message, in a case where a number of terminals is greater than one.

* * * * *